(12) United States Patent
Bernardo et al.

(10) Patent No.: US 11,634,014 B2
(45) Date of Patent: Apr. 25, 2023

(54) RETRACTABLE TRUCK BED COVER HAVING SLAT ARRAY WITH FLEXIBLE JOINER MEMBERS AND SHIELDED SEAMS

(71) Applicant: ROLL-N-LOCK CORPORATION, Pompano Beach, FL (US)

(72) Inventors: Richard Gregory Bernardo, Pompano Beach, FL (US); Brandon Gregory Bernardo, Pompano Beach, FL (US)

(73) Assignee: ROLL-N-LOCK CORPORATION, Pompano Beach, FL (US)

( * ) Notice: Subject to any disclaimer, the term of this patent is extended or adjusted under 35 U.S.C. 154(b) by 379 days.

(21) Appl. No.: 17/065,415

(22) Filed: Oct. 7, 2020

(65) Prior Publication Data

US 2021/0016642 A1    Jan. 21, 2021

Related U.S. Application Data

(63) Continuation of application No. 16/144,906, filed on Sep. 27, 2018, now Pat. No. 10,800,231, which is a continuation of application No. 15/213,180, filed on Jul. 18, 2016, now Pat. No. 10,137,766, which is a continuation of application No. 14/450,616, filed on Aug. 4, 2014, now Pat. No. 9,399,391.

(51) Int. Cl.
| | |
|---|---|
| *B60J 7/04* | (2006.01) |
| *B60J 10/277* | (2016.01) |
| *B60J 7/08* | (2006.01) |
| *B60J 7/19* | (2006.01) |

(52) U.S. Cl.
CPC .............. *B60J 7/041* (2013.01); *B60J 7/085* (2013.01); *B60J 7/196* (2013.01); *B60J 10/277* (2016.02)

(58) Field of Classification Search
CPC ... B60J 7/041; B60J 7/085; B60J 7/196; B60J 10/277; B60J 5/14
USPC .............................. 296/100.12, 100.09, 37.6
See application file for complete search history.

(56) References Cited

U.S. PATENT DOCUMENTS

| | | | |
|---|---|---|---|
| 171,736 | A | 1/1876 | Mooney |
| 309,767 | A | 12/1884 | Clarke |
| 341,307 | A | 5/1886 | Altschwager |
| 540,707 | A | 6/1895 | Wolf |
| 600,898 | A | 3/1898 | Smith |
| 1,127,854 | A | 2/1915 | Belankski |
| 1,214,600 | A | 2/1917 | Silverthorne |
| 1,242,035 | A | 10/1917 | Pierson et al. |

(Continued)

*Primary Examiner* — D Glenn Dayoan
*Assistant Examiner* — E Turner Hicks
(74) *Attorney, Agent, or Firm* — William H. Honaker; Dickinson Wright PLLC

(57) ABSTRACT

A retractable truck bed cover having an array of parallel aluminum slats joined together by connective hinges including leading and trailing edge configuration for improving the security of the cover by covering and concealing the seam between adjacent slats while improving the connective hinge's resistance to the effects of aging and/or exposure to temperature fluctuations. The truck bed cover connective hinge slat is designed to be in an array of discrete slats, which are joined to one another by means of joiner members secured at each end to slat end caps. The distal ends of the joiner members are attached to slat end caps at the distal ends of the slats, thereby preventing the joiner members from shrinking in relationship to the slats due to aging and / or exposure to temperature fluctuations.

20 Claims, 3 Drawing Sheets

(56) References Cited

U.S. PATENT DOCUMENTS

| | | |
|---|---|---|
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,655,797 A | 1/1928 | Peck |
| 1,764,615 A | 6/1930 | Edwards |
| 1,812,580 A | 6/1931 | Black |
| 1,930,841 A | 10/1933 | Miniere |
| 2,067,994 A | 1/1937 | Thwaits |
| 2,483,947 A | 10/1949 | Turner |
| 2,514,466 A | 7/1950 | Bildhauer |
| D160,213 S | 9/1950 | Samuelson |
| 2,530,365 A | 11/1950 | Johnson et al. |
| 2,621,357 A | 12/1952 | Stuman |
| 2,626,179 A | 1/1953 | Gonzalez |
| 2,663,447 A | 12/1953 | Westcott |
| RE23,814 E | 4/1954 | Ingram |
| 2,713,897 A | 7/1955 | Teague et al. |
| 2,720,414 A | 10/1955 | Hart |
| 2,795,363 A | 6/1957 | Turner |
| 2,795,383 A | 6/1957 | Turner |
| 2,797,959 A | 7/1957 | Brice |
| 2,872,239 A | 2/1959 | Bowness et al. |
| 2,874,885 A | 2/1959 | Young |
| 3,148,724 A | 9/1964 | Chieger et al. |
| 3,329,385 A | 7/1967 | Dietsch |
| 3,357,670 A | 12/1967 | Larson et al. |
| 3,656,801 A | 4/1972 | Doutt et al. |
| 3,675,959 A | 7/1972 | Hansen et al. |
| 3,734,560 A | 5/1973 | Cramblet |
| 3,773,143 A | 11/1973 | Del Prete et al. |
| 3,902,599 A | 9/1975 | Stromberg |
| 4,023,850 A | 5/1977 | Tillery |
| 4,063,774 A | 12/1977 | Hanks |
| 4,132,335 A | 1/1979 | Ingram |
| 4,136,905 A | 1/1979 | Morgan |
| 4,145,044 A | 3/1979 | Wilson et al. |
| 4,270,681 A | 6/1981 | Ingram |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,592,529 A | 6/1986 | Suzuki |
| 4,596,417 A | 6/1986 | Bennett |
| 4,635,992 A | 1/1987 | Hamilton |
| 4,650,144 A | 3/1987 | ConraD |
| 4,652,035 A | 3/1987 | Austin, Jr. |
| 4,659,136 A | 4/1987 | Martin et al. |
| D291,789 S | 9/1987 | Noga |
| D294,137 S | 2/1988 | Robson |
| 4,749,226 A | 6/1988 | Heft |
| 4,750,773 A | 6/1988 | Chapline |
| 4,770,458 A | 9/1988 | Burke et al. |
| 4,778,213 A | 10/1988 | Palmer |
| 4,786,119 A | 11/1988 | Smuda |
| 4,793,397 A | 12/1988 | Whiteman |
| 4,795,206 A * | 1/1989 | Adams .............. B60J 5/14 296/100.09 |
| D300,734 S | 4/1989 | Kruitbosch |
| 4,824,158 A | 4/1989 | Peters et al. |
| 4,828,312 A | 5/1989 | Kinkel |
| 4,830,242 A | 5/1989 | Painter |
| 4,850,770 A | 7/1989 | Millar, Jr. |
| 4,860,495 A | 8/1989 | Kessler |
| 4,875,724 A | 10/1989 | Gruber |
| D305,111 S | 12/1989 | Zagner |
| 4,884,317 A | 12/1989 | Liu |
| D308,627 S | 6/1990 | Guffey |
| 4,953,820 A | 9/1990 | Yoder |
| 4,961,677 A | 10/1990 | Downard, Jr. |
| 5,005,892 A | 4/1991 | Haugen et al. |
| 5,011,349 A | 4/1991 | McAndrews |
| 5,024,409 A | 6/1991 | Bohnen |
| 5,037,152 A | 8/1991 | Hendricks |
| 5,037,153 A | 8/1991 | Stark |
| 5,040,843 A * | 8/1991 | Russell ............... E06B 9/581 296/100.09 |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,123,691 A | 6/1992 | Ginn |
| 5,127,697 A | 7/1992 | St. Marie |
| 5,129,665 A | 7/1992 | Sutter et al. |
| 5,147,103 A | 9/1992 | Ducote |
| 5,154,470 A | 10/1992 | Bringman, Jr. |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| D337,934 S | 8/1993 | Young |
| 5,234,122 A | 8/1993 | Cherng |
| 5,251,950 A | 10/1993 | Bernardo |
| 5,253,913 A | 10/1993 | Metivier |
| 5,299,773 A | 4/1994 | Bertrand |
| 5,301,913 A | 4/1994 | Wheatley |
| 5,310,155 A | 5/1994 | Wu |
| 5,310,238 A | 5/1994 | Wheatley |
| 5,330,246 A * | 7/1994 | Bernardo ............ B60J 7/068 160/130 |
| 5,357,376 A | 10/1994 | Yoshida |
| 5,380,141 A | 1/1995 | Flowers |
| 5,385,377 A | 1/1995 | Girard |
| 5,396,915 A | 3/1995 | Bomar |
| 5,417,340 A | 5/1995 | Anthony |
| 5,421,633 A | 6/1995 | Moore et al. |
| D360,614 S | 7/1995 | Alcocer |
| 5,441,324 A | 8/1995 | Gold |
| 5,443,341 A | 8/1995 | Hamilton |
| 5,456,511 A | 10/1995 | Webber |
| 5,460,393 A | 10/1995 | Tsai |
| 5,460,423 A | 10/1995 | Kersting et al. |
| 5,468,038 A | 11/1995 | Sauri |
| D365,323 S | 12/1995 | Napierkowski et al. |
| 5,487,585 A | 1/1996 | Wheatley |
| 5,500,983 A | 3/1996 | Lautenschlager |
| 5,540,475 A | 7/1996 | Kersting |
| 5,573,161 A | 11/1996 | Stapleton |
| 5,579,970 A | 12/1996 | Cucheran et al. |
| 5,588,630 A | 12/1996 | Chen-Chao |
| 5,622,296 A | 4/1997 | Pirhonen et al. |
| 5,636,893 A | 6/1997 | Wheatley et al. |
| 5,655,808 A | 8/1997 | Wheatley |
| 5,658,033 A | 8/1997 | Delaune |
| 5,673,958 A | 10/1997 | Gramss |
| 5,685,686 A | 11/1997 | Burns |
| 5,700,047 A | 12/1997 | Leitner et al. |
| 5,730,342 A | 3/1998 | Tien |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |
| 5,775,759 A | 7/1998 | Cummings |
| 5,782,282 A * | 7/1998 | Chen ................. E05D 3/12 160/40 |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,816,637 A | 10/1998 | Adams et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |
| 5,857,724 A | 1/1999 | Jarman |
| 5,857,729 A | 1/1999 | Bogard |
| 5,862,964 A | 1/1999 | Moliner |

(56) References Cited

U.S. PATENT DOCUMENTS

| | | |
|---|---|---|
| 5,873,688 A | 2/1999 | Wheatley |
| 5,893,500 A | 4/1999 | Cucheran et al. |
| D410,429 S | 6/1999 | Derecktor |
| 5,911,464 A | 6/1999 | White |
| 5,913,465 A | 6/1999 | Potter et al. |
| 5,924,614 A | 7/1999 | Kuntze et al. |
| 5,924,753 A | 7/1999 | DiBassie |
| 5,975,618 A | 11/1999 | Rippberger |
| 5,984,379 A | 11/1999 | Michel et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,024,401 A | 2/2000 | Wheatley et al. |
| 6,024,402 A | 2/2000 | Wheatley |
| 6,039,520 A | 3/2000 | Cheng |
| 6,053,558 A | 4/2000 | Weldy et al. |
| 6,059,159 A | 5/2000 | Fisher |
| 6,076,881 A | 6/2000 | Tucker |
| 6,082,801 A | 7/2000 | Owen et al. |
| 6,092,263 A | 7/2000 | Boue et al. |
| 6,102,265 A | 8/2000 | Stapleton |
| 6,112,964 A | 9/2000 | Cucheran et al. |
| 6,112,965 A | 9/2000 | Lundgren |
| 6,113,173 A | 9/2000 | Leitner et al. |
| 6,113,176 A | 9/2000 | Bernardo |
| 6,113,328 A | 9/2000 | Claucherty |
| 6,120,076 A | 9/2000 | Adsit et al. |
| 6,123,305 A | 9/2000 | LukasavitZ |
| 6,129,490 A | 10/2000 | Erskine et al. |
| 6,149,219 A | 11/2000 | Schambre et al. |
| 6,149,220 A | 11/2000 | Weldy et al. |
| 6,227,593 B1 | 5/2001 | De Valcourt |
| 6,227,602 B1 | 5/2001 | Bogard |
| 6,256,844 B1 | 7/2001 | Wheatley |
| 6,257,637 B1 | 7/2001 | Reed |
| 6,264,266 B1 | 7/2001 | Rusu et al. |
| 6,269,990 B1 | 8/2001 | Gray |
| 6,273,491 B1 | 8/2001 | Bath et al. |
| 6,276,735 B1 * | 8/2001 | Champion .............. B60R 11/06 296/100.1 |
| 6,283,525 B1 | 9/2001 | Morse |
| 6,338,515 B1 | 1/2002 | Munhall |
| 6,340,190 B1 | 1/2002 | Rosebrugh et al. |
| 6,340,194 B1 | 1/2002 | Muirhead et al. |
| 6,350,089 B1 | 2/2002 | Tekavec |
| 6,352,295 B1 | 3/2002 | Leitner |
| 6,378,926 B1 | 4/2002 | Renze et al. |
| 6,390,427 B1 | 5/2002 | McConnell et al. |
| 6,402,215 B1 | 6/2002 | Leitner et al. |
| 6,422,627 B1 | 7/2002 | Kuhn et al. |
| 6,425,618 B1 | 7/2002 | Garland et al. |
| 6,454,338 B1 | 9/2002 | Glickman et al. |
| 6,471,277 B1 | 10/2002 | Scensny et al. |
| 6,488,249 B1 | 12/2002 | Girardi et al. |
| 6,494,520 B2 | 12/2002 | Brzenchek et al. |
| 6,499,791 B2 | 12/2002 | Wheatley |
| 6,513,688 B2 | 2/2003 | Kmita et al. |
| 6,540,123 B1 | 4/2003 | Kmita et al. |
| 6,543,836 B1 | 4/2003 | Wheatley |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,568,740 B1 | 5/2003 | Dimmer |
| 6,575,520 B1 | 6/2003 | Spencer |
| 6,585,465 B1 | 7/2003 | Hammond et al. |
| 6,598,922 B2 | 7/2003 | Morse et al. |
| 6,604,898 B2 | 8/2003 | Price |
| 6,607,228 B2 | 8/2003 | Carter, III et al. |
| 6,626,478 B1 | 9/2003 | Minton |
| 6,637,707 B1 | 10/2003 | Gates et al. |
| D485,800 S | 1/2004 | Smith et al. |
| 6,676,182 B2 | 1/2004 | Fitts |
| 6,719,261 B2 | 4/2004 | Wadsworth |
| 6,719,345 B2 | 4/2004 | Ootsuka et al. |
| 6,722,541 B1 | 4/2004 | Aftanas et al. |
| 6,742,973 B1 | 6/2004 | Hendrix et al. |
| 6,752,575 B1 | 6/2004 | Moore et al. |
| 6,789,832 B2 | 9/2004 | Gort et al. |
| 6,796,471 B2 | 9/2004 | Aftanas et al. |
| 6,805,392 B2 | 10/2004 | Leitner et al. |
| 6,811,203 B2 | 11/2004 | Wheatley |
| 6,814,389 B2 | 11/2004 | Wheatley |
| 6,824,191 B2 | 11/2004 | Wheatley |
| 6,843,394 B2 | 1/2005 | Aki |
| D501,443 S | 2/2005 | Jones et al. |
| D504,384 S | 4/2005 | StrascheWski |
| 6,874,747 B2 | 4/2005 | Oh |
| 6,889,878 B2 | 5/2005 | Parsons |
| 6,893,073 B2 | 5/2005 | Wheatley |
| 6,913,175 B2 | 7/2005 | Martin |
| 6,918,624 B2 | 7/2005 | Miller et al. |
| 6,923,488 B2 | 8/2005 | Bruford et al. |
| 6,942,225 B2 | 9/2005 | Gentemann et al. |
| 6,948,763 B2 | 9/2005 | Robbins |
| 6,966,595 B2 | 11/2005 | Bruford et al. |
| 6,976,724 B2 | 12/2005 | Wheatley |
| 6,983,972 B2 | 1/2006 | Tan et al. |
| 6,994,389 B1 | 2/2006 | Graffy et al. |
| 6,997,657 B1 | 2/2006 | Saward |
| 7,007,995 B1 | 3/2006 | Scarberry et al. |
| 7,025,403 B2 | 4/2006 | Wheatley |
| 7,040,849 B2 | 5/2006 | Cunningham et al. |
| 7,063,366 B2 | 6/2006 | Leitner et al. |
| 7,093,870 B2 | 8/2006 | Kim et al. |
| 7,100,956 B1 | 9/2006 | Wilkins |
| 7,111,886 B1 | 9/2006 | Miller et al. |
| 7,121,604 B2 | 10/2006 | Reed |
| 7,152,902 B2 | 12/2006 | Moen et al. |
| 7,159,918 B2 | 1/2007 | Lussier |
| 7,175,218 B1 | 2/2007 | Keene |
| 7,175,377 B2 | 2/2007 | Womack et al. |
| 7,182,380 B2 | 2/2007 | Nagle |
| 7,188,888 B2 | 3/2007 | Wheatley et al. |
| 7,195,432 B2 | 3/2007 | Earle et al. |
| 7,204,540 B2 | 4/2007 | Wheatley |
| D544,826 S | 6/2007 | Smith |
| 7,226,100 B1 | 6/2007 | Willey et al. |
| 7,229,116 B1 | 6/2007 | Bruford et al. |
| 7,240,940 B2 | 7/2007 | Leitner |
| 7,252,322 B2 | 8/2007 | Rusu |
| 7,258,387 B2 | 8/2007 | Weldy |
| 7,267,387 B1 | 9/2007 | Bruford et al. |
| D553,072 S | 10/2007 | Smith |
| 7,287,943 B1 | 10/2007 | SaWard |
| 7,303,222 B2 | 12/2007 | Wilkins |
| 7,322,633 B2 | 1/2008 | Zajicek et al. |
| 7,334,830 B2 | 2/2008 | Weldy |
| 7,347,473 B2 | 3/2008 | Miller et al. |
| D568,230 S | 5/2008 | Smith |
| 7,384,090 B1 | 6/2008 | Weldy |
| 7,393,035 B2 | 7/2008 | Leitner et al. |
| 7,413,231 B1 | 8/2008 | Wood et al. |
| 7,427,095 B2 | 9/2008 | Wheatley |
| 7,445,264 B2 | 11/2008 | Spencer et al. |
| 7,464,976 B2 | 12/2008 | Smith |
| 7,484,790 B2 | 2/2009 | Wheatley |
| 7,488,021 B1 | 2/2009 | Roos et al. |
| 7,506,917 B2 | 3/2009 | Essig |
| 7,513,543 B2 | 4/2009 | Erskine |
| 7,537,264 B2 | 5/2009 | Maimin et al. |
| 7,547,054 B2 | 6/2009 | Leitner |
| 7,549,828 B2 | 6/2009 | Smith |
| D597,924 S | 8/2009 | Smith |
| 7,604,282 B2 | 10/2009 | Spencer et al. |
| 7,607,714 B2 | 10/2009 | Wheatley et al. |
| 7,628,442 B1 | 12/2009 | Spencer et al. |
| 7,654,598 B2 | 2/2010 | Leitner et al. |
| 7,654,599 B2 | 2/2010 | Stewart et al. |
| 7,681,935 B2 | 3/2010 | Leitner et al. |
| D627,703 S | 11/2010 | McLaughlin |
| 7,823,957 B2 | 11/2010 | Williamson |
| 7,841,638 B2 | 11/2010 | Smith |
| 7,845,887 B2 | 12/2010 | Smith |

(56) References Cited

U.S. PATENT DOCUMENTS

| | | |
|---|---|---|
| 7,857,371 B2 | 12/2010 | Leitner |
| 7,878,568 B2 | 2/2011 | Wu |
| 7,900,990 B2 | 3/2011 | Townson |
| 7,905,536 B2 | 3/2011 | Yue |
| 7,905,539 B2 | 3/2011 | De Carli |
| 7,959,203 B2 | 6/2011 | Smith |
| 8,020,737 B2 | 9/2011 | Sweeney |
| 8,020,912 B2 | 9/2011 | Lounds |
| 8,146,982 B2 | 4/2012 | Williamson et al. |
| 8,262,148 B2 | 9/2012 | Rusher et al. |
| 8,297,677 B2 | 10/2012 | Leitner et al. |
| 8,336,946 B2 | 12/2012 | Schrader et al. |
| 8,366,173 B2 | 2/2013 | Xu |
| 8,474,896 B2 * | 7/2013 | Ostberg .................... B60J 5/14 296/37.6 |
| 8,480,154 B2 | 7/2013 | Yue |
| 8,511,736 B2 | 8/2013 | Williamson et al. |
| 8,672,388 B2 | 3/2014 | Rusher |
| 8,678,459 B1 | 3/2014 | Win |
| 8,727,415 B2 | 5/2014 | Smith |
| 8,807,625 B2 | 8/2014 | Garska |
| 9,346,344 B2 | 5/2016 | Smith et al. |
| 9,352,790 B2 | 5/2016 | Smith |
| 9,487,071 B1 | 11/2016 | Yue |
| 9,827,838 B2 | 11/2017 | Hannan et al. |
| 9,827,839 B2 | 11/2017 | Williamson et al. |
| 9,834,076 B2 * | 12/2017 | Rohr ....................... B60J 7/067 |
| 9,834,259 B2 | 12/2017 | Smith |
| 9,840,135 B2 | 12/2017 | Rusher et al. |
| 9,840,136 B2 | 12/2017 | Smith et al. |
| 10,081,235 B2 | 9/2018 | Freitas et al. |
| 10,086,746 B2 | 10/2018 | Loew et al. |
| 10,093,159 B1 | 10/2018 | Zichettello et al. |
| 10,094,159 B2 | 10/2018 | Grudzinski et al. |
| 10,099,544 B2 | 10/2018 | Battiato |
| 10,106,022 B2 | 10/2018 | Xu |
| 10,106,089 B2 | 10/2018 | Herman |
| 10,112,465 B2 | 10/2018 | Flocco |
| 10,137,766 B2 | 11/2018 | Bernardo et al. |
| 10,144,276 B2 | 12/2018 | Facchinello et al. |
| 10,166,849 B2 | 1/2019 | Facchinello et al. |
| 10,232,691 B1 | 3/2019 | Weng et al. |
| 10,308,101 B2 | 6/2019 | Kim et al. |
| 10,328,778 B2 | 6/2019 | Aubrey et al. |
| 10,399,421 B2 | 9/2019 | Smith et al. |
| 10,647,187 B2 | 5/2020 | Slinger et al. |
| 2001/0005960 A1 | 7/2001 | Yamaguchi et al. |
| 2002/0000732 A1 | 1/2002 | Sanders |
| 2003/0057726 A1 | 3/2003 | Wheatley |
| 2004/0080174 A1 | 4/2004 | Buelna |
| 2004/0134953 A1 | 7/2004 | Perez |
| 2005/0077747 A1 | 4/2005 | De Gaillard et al. |
| 2006/0091170 A1 | 5/2006 | Almhil |
| 2006/0091171 A1 | 5/2006 | Wardell et al. |
| 2006/0208524 A1 | 9/2006 | Brown et al. |
| 2006/0263163 A1 | 11/2006 | Harberts et al. |
| 2006/0283900 A1 | 12/2006 | Stapleton |
| 2007/0170739 A1 | 7/2007 | Sims |
| 2007/0262602 A1 | 11/2007 | Nagle |
| 2008/0101883 A1 | 5/2008 | Derecktor |
| 2008/0106114 A1 | 5/2008 | Wheatley |
| 2008/0129077 A1 | 6/2008 | Weldy |
| 2008/0231073 A1 | 9/2008 | Essig |
| 2009/0020576 A1 | 1/2009 | Gale |
| 2010/0270824 A1 | 10/2010 | Yue |
| 2010/0283280 A1 | 11/2010 | Kohlstrand et al. |
| 2011/0175387 A1 | 7/2011 | Smith |
| 2012/0319423 A1 | 12/2012 | Smith |
| 2013/0093206 A1 * | 4/2013 | Rusher .................... B60J 7/085 296/100.14 |
| 2013/0119693 A1 | 5/2013 | Leitner et al. |
| 2013/0341956 A1 | 12/2013 | Garska |
| 2013/0341960 A1 | 12/2013 | Garska |
| 2015/0054300 A1 | 2/2015 | Shi et al. |
| 2017/0326956 A1 | 11/2017 | Marshall |
| 2017/0341494 A1 | 11/2017 | Hannan et al. |
| 2017/0349081 A1 | 12/2017 | Yilma et al. |
| 2017/0355251 A1 | 12/2017 | Rossi |
| 2017/0361755 A1 | 12/2017 | Yilma et al. |
| 2018/0147925 A1 | 5/2018 | Williamson et al. |
| 2018/0272930 A1 | 9/2018 | Dylewski et al. |
| 2018/0281572 A1 | 10/2018 | Zichettello et al. |
| 2018/0281573 A1 | 10/2018 | Zichettello et al. |
| 2018/0281574 A1 | 10/2018 | Zichettello et al. |
| 2018/0281575 A1 | 10/2018 | Singer |
| 2018/0281576 A1 | 10/2018 | Zichettello et al. |
| 2018/0290527 A1 | 10/2018 | Marchlewski et al. |
| 2018/0290529 A1 | 10/2018 | Ching |
| 2018/0297456 A1 | 10/2018 | Stickles et al. |
| 2018/0339578 A1 | 11/2018 | Sullivan |
| 2018/0339581 A1 | 11/2018 | Rossi et al. |
| 2018/0339658 A1 | 11/2018 | Frederick et al. |
| 2018/0345768 A1 | 12/2018 | Frederick et al. |
| 2018/0345769 A1 | 12/2018 | Dylewski et al. |
| 2019/0105970 A1 | 4/2019 | Bernardo |
| 2019/0168590 A1 | 6/2019 | O'Reilly |
| 2019/0315209 A1 | 10/2019 | Lewis et al. |
| 2020/0130483 A1 | 4/2020 | Vickery |

* cited by examiner

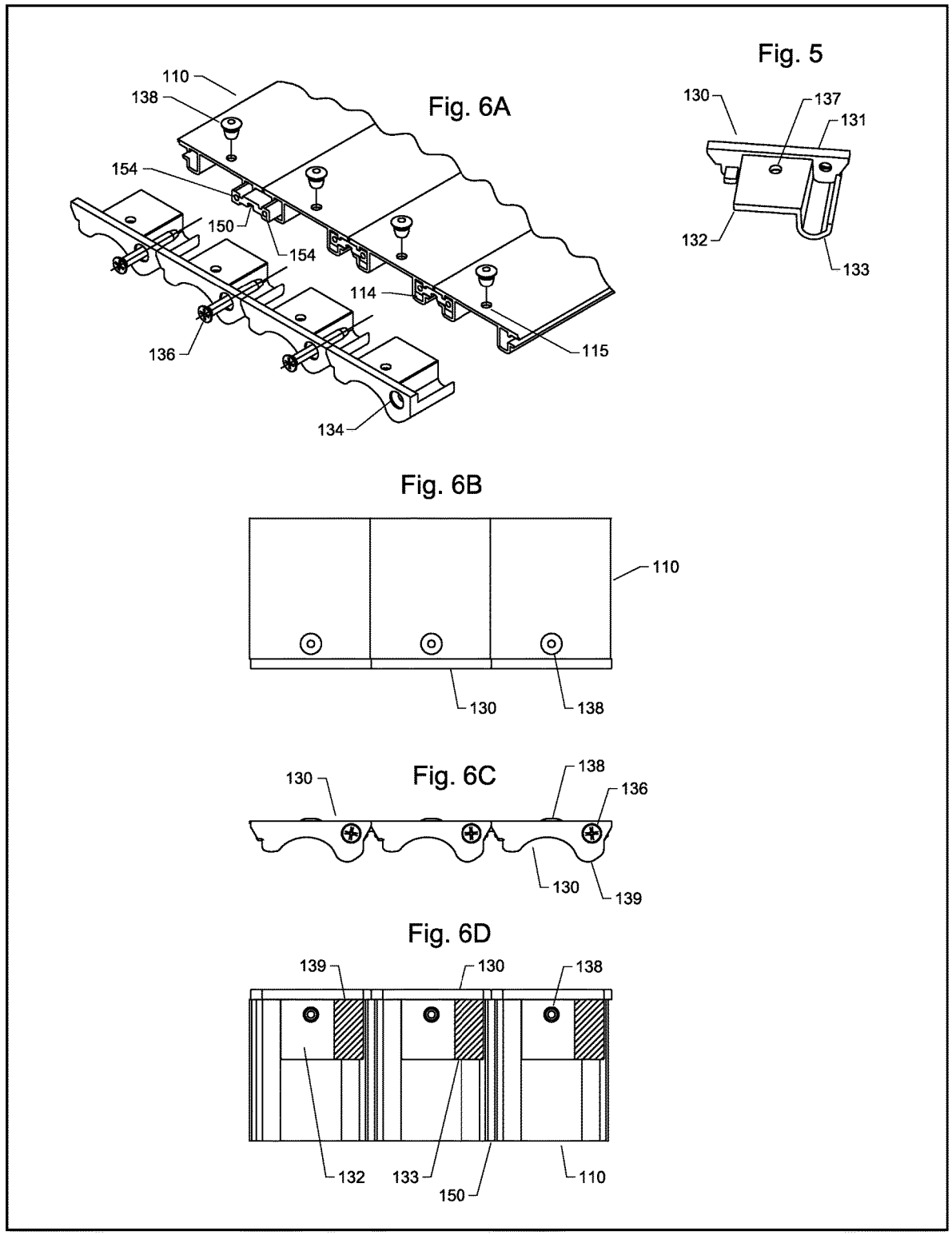

RETRACTABLE TRUCK BED COVER HAVING SLAT ARRAY WITH FLEXIBLE JOINER MEMBERS AND SHIELDED SEAMS

CROSS-REFERENCE TO RELATED APPLICATIONS

Applicant hereby incorporates by reference the disclosures of Applicant's U.S. Pat. No. 5,252,950, entitled "Rolling cover for a truck utility bed having improved reel support housing and guide track clamps," U.S. Pat. No. 5,330,246, entitled "Slat block and guide track apparatus for rolling truck bed cover," and U.S. Pat. No. 6,113,176, entitled "Slat house hinge for laminated retractable truck bed cover." Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This invention relates generally to a retractable truck bed cover made up of an array of parallel aluminum slats joined together along each slat's leading and trailing edges for water integrity, security and flexibility.

Description of the Related Art

The design and use of retractable truck bed covers with open bed pickup trucks to provide security and protection for cargo items carried within the truck bed is well known. Conventional retractable truck bed covers commonly include a plurality of individual slats hingedly connected to form a slat array. The hinged connection of individual slats enables the slat array to form a continuous cover that, once mounted in a pair of side rails, can be moved from a first flat position covering the truck bed to a second stored position where the cover is retracted (rolled up) on a reel or spindle in a housing.

One type of slat array design for conventional retractable truck bed covers is defined by rigid individual slats, generally extruded or formed aluminum, which are arranged together along their edges such that their edges are overlapped and covered with a pliable, continuous surface material laminate. In this laminated slat array design, the individual slats overlap, engaging one another in an interlocking joint, while the laminate surface material functions to secure the overlapping slats together, to form an articulating cover body.

Another type of slat array design for conventional retractable truck bed covers is defined by rigid slats joined together along their edges with connective hinge bodies such that they are immediately contiguous to one another with adjacent slats fastened together without overlapping. For this connective hinge slat array design, flexible joiner members are commonly utilized as connective hinge bodies to attach adjacent individual slats by engaging and extending (or bridging) between receptor channels disposed in the opposing edges of the adjacent slats. In this regard, the joiner members are operative to both attach the slats together and enable the desired hinging movement between adjacent slats because of their flexibility. The joiner members also function as the water seal or gasket between the contiguous slats and therefore, to function effectively, must be continuous from end to end (along the entire length) of the contiguous slats.

While this connective hinge type of slat array design provides some manufacturing efficiencies, it is also subject to some well-known weaknesses and vulnerabilities. One such weakness comes from the ease in which the individual slats can be separated. Because the individual slats are arranged so that they do not overlap when joined together and are not covered by a laminate surface material, the seam between individual slats remains exposed. If a box cutter, razor knife, or other blade is simply inserted into and run along the exposed seam between contiguous slats, the joiner member can be cut, thereby detaching the contiguous slats and breaching the security of the cover. Another vulnerability relates to the tendency for the joiner member, which are typically extruded silicon, to contract over time due to aging and/or exposure to temperature fluctuations. This shrinkage often results in the joiner members no longer extending from end to end of contiguous slats, leaving the end portions of such contiguous slats that make up the slatted array with exposed spaces between the slats and compromising the water tightness of the cover body.

Accordingly, there remains a need for a modified retractable truck bed cover design which would eliminate exposed seam security vulnerability of conventional connective hinge style slats when placed in a slat array. It would be helpful if such a modified truck bed cover slat was able to protect the joiner member connecting adjacent slats in an array without requiring a restrictive overlap or interlock between adjacent slats. It would be additionally desirable for such a modified truck bed cover slat to overcome the problem of joiner member shrinkage and the associated issue of water penetration.

The Applicant's invention described herein provides for an improved retractable truck bed cover slat with connective hinge style slats arranged in a slat array that employs a means to address the shortcomings of prior art designs by protecting the attaching joiner member between contiguous slats while also preventing the joiner member from shrinking and contracting. The primary components of Applicant's modified truck bed cover slat are an aluminum base slat, a silicon joiner member, and a molded slat end cap. When in operation, the modified truck bed cover slat allows the assembly of a slat array which improves the security provided by conventional connective hinge slatted truck bed covers and addresses other limitations or shortcomings imposed by the conventional slat structures in the prior art.

SUMMARY OF THE INVENTION

A retractable truck bed cover comprising an array of parallel elongated, extruded aluminum slats joined together along their overlapped leading and trailing edges by flexible silicon hinges. The truck bed cover connective hinge slat improves the security of the cover by shielding access to the seam between adjacent slats while enabling stabilization of the silicone hinge joiner strip. Applicant's connective hinge slat is designed to be used in an array of discrete, adjacent slats which are each interconnectedly joined together sequentially through discrete joiner members, the distal ends of which are held fast to slat end caps, forming a continuous slat array suitable for use as a retractable truck bed cover.

Each slat includes a slat surface having a leading edge defined by an inverted step nib and trailing edge defined by an upright step nib. When two slats are placed contiguously with the first slat's leading edge against the second slat's trailing edge, the shape of the inverted step nib and the upright step nib form an over and under half lap splice joint between the first slat and the second slat that provides a redundant structural barrier covering and protecting the seam area disposed between the two adjacent slats. Extending downward from the slat surface, on both the leading edge side and the trailing edge side, are mirror image receptor channels which are adapted to receive and hold the connector section of a hinge joiner member for the entire length of each slat.

Each slat joiner member is a single, flexible body which has a hinge section at its center that is designed to improve the flexibility of the joiner member and is disposed between two mirror image connector sections or bosses which are each sized and shaped to sleeve into and be captured within the receptor channels of opposing slats. Two adjacent slats can thus be joined together at their leading and trailing edges through the connector section on one side of the joiner member being placed in the receptor channel on the leading edge side of the first slat and the connector section on the other side of the same joiner member being placed in the receptor channel on the trailing edge side of the second slat (or vice versa). The joined adjacent slats retain the ability to pivotally hinge through the flexibility of the hinge section of the joiner member and the non-restrictive half lap splice lap joint to allow the truck bed cover to be retracted and extended.

At each end of each discrete slat is a slat end cap independently positioned and engaged to the end of the slat, and secured thereto through the use of a rivet fastener. Each slat end cap is additionally fastened to the end connector section of the joiner member in one receptor channel of the respective slat. Through its engagement to the end of the slat and attachment to the end of the joiner member, the slat end cap provides a means for maintaining the joiner members fixed to the ends of the slat preventing the joiner member from shrinking due to aging or temperature fluctuations and the resultant leaks in the peripheral edges of the slatted cover. The slat end caps also function collectively as the primary bearing surface upon which the cover body assembly is carried within the supporting side tracks.

It is an object of this invention to provide a truck bed cover connective hinge slat which eliminates the exposed seam security vulnerability of conventional connective hinge slats when placed in a slat array.

It is another object of this invention to provide a truck bed cover connective hinge slat which protects the joiner member connecting adjacent slats in an array without requiring a restrictive overlap or interlock between adjacent slats.

It is yet another object of this invention to prevent the contraction or shrinkage of the joiner member connecting adjacent connective hinge slats due to aging or exposure to temperature fluctuations.

It is still another object of this invention to provide a bearing surface beneath an array of connective hinge slats that reduces friction and ensures smooth operation of the slatted cover body within the side support tracks of a retractable truck bed cover assembly.

These and other objects will be apparent to one of skill in the art.

BRIEF DESCRIPTION OF THE DRAWINGS

FIG. 1A is a perspective cut away view of the slat ends.

FIG. 5 is a perspective view of the slat end cap of a truck bed cover slat built in accordance with the present invention.

FIG. 6A is an exploded perspective view of a truck bed cover slat assembly with an extended joiner member and slat end cap built in accordance with the present invention.

FIG. 6B is a top plan view of a truck bed cover slat assembly with an extended joiner member and slat end cap built in accordance with the present invention.

FIG. 6C is a side elevational view of a truck bed cover slat assembly with slat end caps built in accordance with the present invention.

FIG. 6D is a bottom plan view of a truck bed cover slat assembly with slat end cap built in accordance with the present invention.

DETAILED DESCRIPTION OF THE PREFERRED EMBODIMENT

Figure 1:
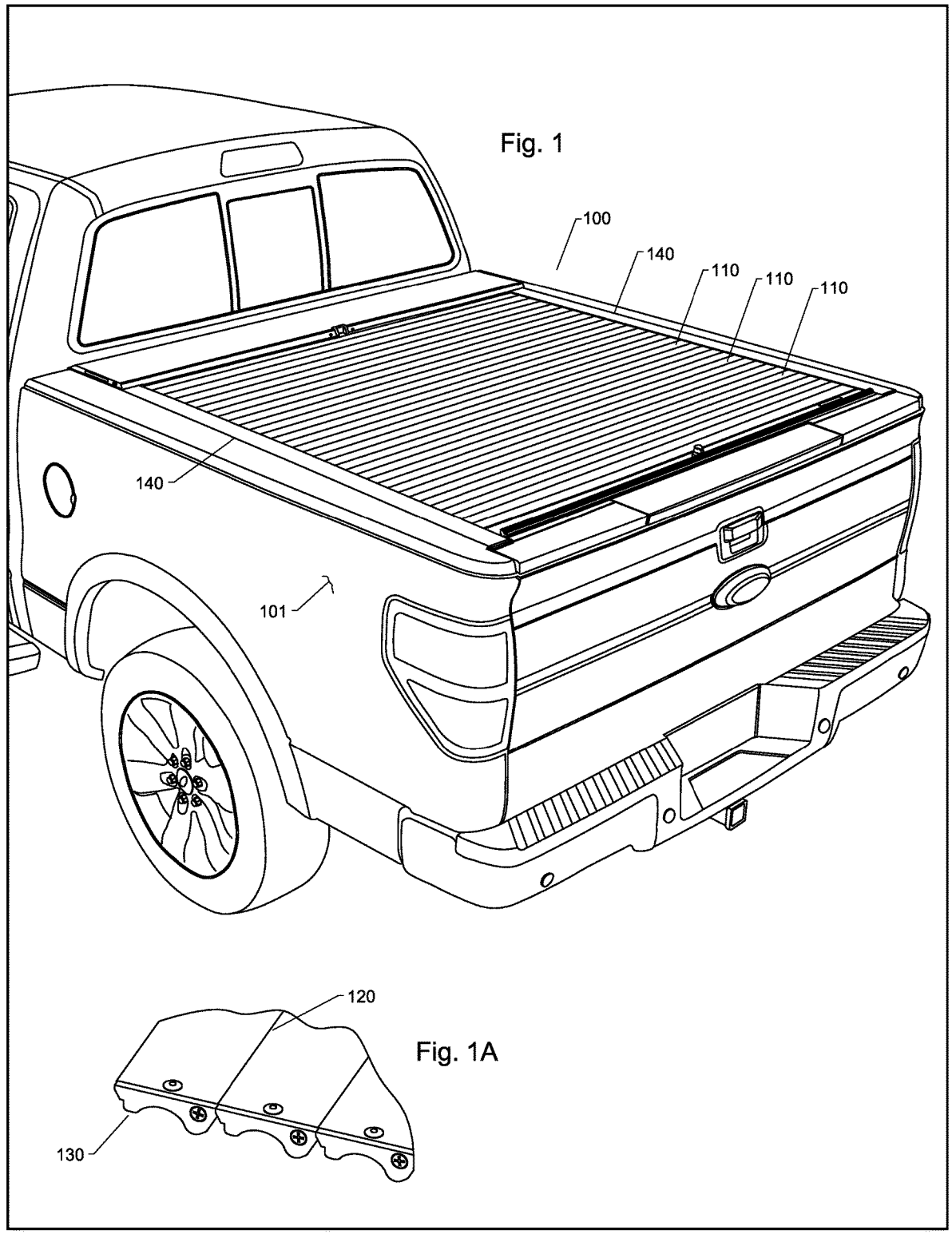
FIG. 1 is a perspective view of a truck bed cover built in accordance with the present invention installed onto a conventional pickup truck utility bed.

Referring now to the drawings and in particular FIG. 1 and FIG. 1A, a retractable truck bed cover 100 in accordance with the present invention is shown having a plurality of parallel slats 110 disposed in a contiguous arrangement and attached together. A connective hinge 120 is disposed between each slat 110, enabling the plurality of slats 110 to form a single slat array which defines the body of the truck bed cover 100. A slat end cap 130 is secured to the end of each discrete slat 110. The roll-up truck bed cover 100 slat array in accordance with the present invention is mounted inside a guide track 140 connected to the side 101 of the pickup truck with the slat end caps 130 providing the primary bearing surface upon which the cover body assembly is carried within the supporting side tracks.

In the preferred embodiment, each slat 110 is a rigid, elongated aluminum extruded strip which is sized to reach from one side of the truck bed to the other laterally. Along each sidewall 101 of the truck bed are mounted a pair of guide tracks 140 that are connected to the truck bed walls 101 as described in Applicant's previous patents cited above. As will be described in more detail below, the body of each slat 110 has integrally formed therein a receptor channel on both the leading and trailing edges that extend for the length of the slat. The receptor channels receive and capture one end of a joiner member, with the other end of the joiner member captured by the opposing receptor channel of the adjacent slat 110, forming the connective hinge 120 which enables the slats 110 to interlock pivotally with the adjacent slats 110 in an edge-to-edge array. Each joiner member extends the entire length of a slat and is fastened to an end cap 130 at each end of slat 110. Each slat additionally includes a slat end cap 130 secured to each slat end which maintains and secures each end of the joiner member in the receptor channel to the end of its respective slat 110 to prevent shrinkage.

Figure 2:
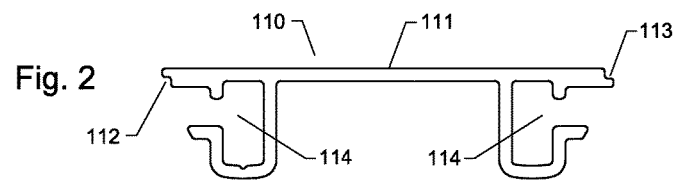
FIG. 2 is a side elevational view of a truck bed cover slat built in accordance with the present invention.

Referring now to FIG. 2, each discrete slat 110 includes slat surface 111 having a leading edge 112 and trailing edge 113. The leading edge 112 is defined by an inverted step nib which forms a first structural barrier to the seam area disposed between two adjacent slats 110 arranged contiguously, edge-to-edge. The trailing edge 113 is defined by an upright step nib which forms a second structural barrier to the seam area disposed between two adjacent slats 110 arranged contiguously, edge-to-edge. When two slats 110 are placed contiguously with the first slat's 110 leading edge 112 against the second slat's 110 trailing edge 113, the shape of the inverted step nib and the shape of the upright step nib form a half lap splice lap joint between the first slat 110 and the second slat 110.

Integral with the slat surface 111, on both the leading edge 112 side and the trailing edge 113 side, are mirror image receptor channels 114 which extend downwardly below the slat surface 111. The mirror image receptor channel 114 on the side of the leading edge 112 includes an open end which faces towards the leading edge 112 and the mirror image receptor channel 114 on the side of the trailing edge 113 and includes an open end which faces towards the leading edge 112. The receptor channels 114 enable the slat 110 to receive and hold a connector section of the joiner member shown in FIG. 3.

Figure 3:
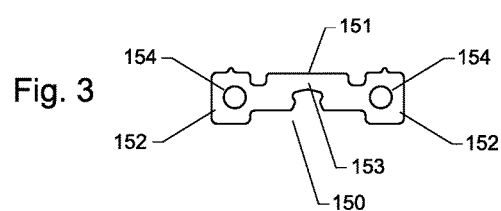
FIG. 3 is a side elevational view of the joiner member of a modified truck bed cover slat built in accordance with the present invention.

Referring now to FIGS. 2 and 3, a joiner member 150 in accordance with the preferred embodiment of the present invention defines a single continuous body constructed out of a flexible material such as silicon and which has a hinge section 151 disposed between two mirror image connector sections 152. Despite the joiner member 150 being constructed out of a flexible material, the hinge section 151 additionally includes a narrowing area 153 to enable greater flexibility to bend and allow hinging movement.

Each connector section 152 is sized and shaped to slide into and be captured within a receptor channel 114 of a slat 110 built in accordance with the present invention. In this regard, a first slat 110 and a second slat 110 can be locked together in a contiguous arrangement that still permits hinging movement between slats when the connector section 152 on one side of the joiner member 150 is held in place in the receptor channel 114 on the leading edge 112 of the first slat 110 and the connector section 152 on the opposite side of the same joiner member 150 is held in place by the trailing edge 113 of the second slat 110. Each connector section 152 additionally includes a retention aperture 154 at its center which runs longitudinally and therefore runs throughout the length of the joiner member 150. The retention aperture 154 is sized to receive an end retention screw that enables a slat end cap to be fastened to joiner member 150.

In the preferred embodiment, the slats 110 are constructed of extruded aluminum and the joiner members 150 are constructed out of extruded silicon. It is additionally contemplated that the surface of the slats 110 may include a powder-coat or anodized finish that improves the overall appearance of the cover body assembly.

Figure 4A:
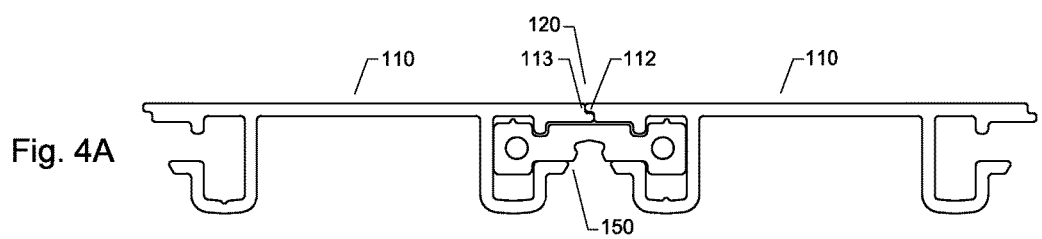
FIG. 4A is a side cross-sectional view of two adjacent truck bed cover slats connected with a joiner member in accordance with the present invention in a flat position which would represent covering a truck bed.

Referring now to FIG. 4A, a first slat 110 and a second slat 110 (collectively, slats 110) are shown locked together by a joiner member 150 and in a flat position, wherein the slats 110 are in the same plane, constituting the covered truck bed position. The first slat 110 is positioned with its trailing edge 113 adjacent to the leading edge 112 of the second slat 110. Together, the trailing edge 113, leading edge 112, and joiner member 150 form the connective hinge of the first slat 110 and the second slat 110. With the first slat 110 and the second slat 110 in the flat position, the half lap splice lap joint remains in a closed position. The closed half-lap splice lap joint forms an offset seam, which is operative to prevent any blade or slicing structure from passing through the seam and cutting the joiner member 150. As such, the closed half lap splice lap joint effectively protects the joiner member 150 which connects the adjacent slats 110 and eliminates the exposed seam security vulnerability present in conventional connective hinge slats.

The joiner member 150 includes two retention apertures 154, one at the center of each connector section 152. The retention apertures 154 each run longitudinally through the length of the joiner member 150. The joiner members are cut flush with the ends of the slats and are therefore equal in length to the slats. When slats 110 and joiner members 150 are assembled into a slat array, the ends of each joiner member 150, and accordingly the retention apertures 154 within the connector sections 152 of each joiner member 150, are accessible at the ends of the slats 110. The purpose of the retention apertures 154 is to provide an attachment receptacle to enable each end of joiner members 150 to be secured to the end of the slats and to a molded end fitting, defined as the slat end cap, which is positioned and independently secured to each end of each slat 110 to prevent the joiner member 150 from shrinking and drawing away from the ends of the slats 110.

Figure 4B:
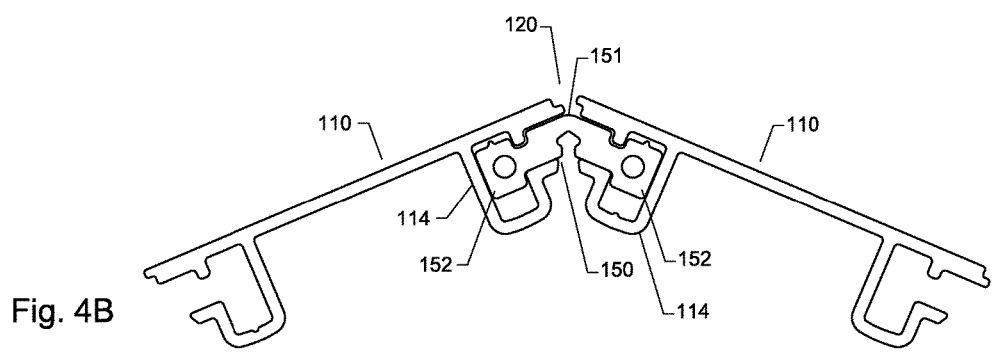
FIG. 4B is a side cross-sectional view of two adjacent truck bed cover slats connected with a joiner member in accordance with the present invention in a rolled up position showing the angular motion permitted with the present hinge joiner member.

Referring now to FIG. 4B, a first slat 110 and a second slat 110 (collectively, slats 110) are shown locked together by a joiner member 150, but pivotally hinged into an acute angle relative to each other. The movement to an acute angle deforms the hinge section 151 of the joiner member 150 as the opposing connector sections 152 are pivotally folded inward relative to and toward one another.

Due to the narrowing of the hinge section 151 and the use of the half-lap splice lap joint, the extent of the acute angle in which the slats 110 can be moved is limited only by the eventual contact of the opposing receptor channel 114 of the first slat 110 with the receptor channel 114 of the second slat 110. Indeed, the use of a half-lap splice lap joint is specifically contemplated to provide an obstruction for the seam between slats 110 that does not restrict the desired hinged movement. As such, it is understood that the capability to hinge contiguous, adjacent slats 110 into such an acute angle relative to one another enables a truck bed cover in accordance with the present invention (i.e., defined by slats 110 locked together by joiner members 150 into a slat array) to be rolled up in a smaller stored position in a manner similar to my previous patents cited above.

Referring now to FIGS. 5, 6A, 6B, 6C, and 6D, each slat end cap 130 is defined by a molded body having an end flange portion 131 and a tongue flange portion 132 with integral J section 133. The end flange portion 131 of the slat end cap 130 fits at a ninety (90) degree relationship to the slat's 110 longitudinal dimension and includes a countersunk hole 134 through its planar surface which aligns with the retention aperture 154 in the connector section 152 of the joiner member 150 when the tongue flange portion 132 is press-fit into the space between the receptor channels 114 of the slat 110. An end retention screw 136 passes through the countersunk hole 134 and into the retention aperture 154 to secure the joiner member 150 to the slat end cap 130. The tongue flange portion 132 of the molded slat end cap 130 also includes a cap rivet hole 137 in its planar surface, and when the tongue flange 132 is press-fit into the space between the receptor channels 114, the cap rivet hole 137 aligns with a corresponding slat rivet hole 115 in the end of the slat 110. The slat end cap 130 is permanently affixed to the end of the slat 110 by way of a rivet 138 which is passed though both the slat rivet hole 115 and the cap rivet hole 137 when the slat end cap 130 is in place on the end of the slat 110. As the slat end cap 130 is press-fitted into place, it also causes the J section 133 of the tongue flange 132 to align with and sleeve over the end portion of one receptor channel 114 J of the slat 110. The bottom surface 139 of the J section 133 is then beneath the receptor channel 114, and being constructed of a specially formulated nylon, enables the J sections 133, one at the end of every slat 110 in the cover body 100 to collectively provide a bearing surface for the underside of the cover body 100 at the points at which the cover body slats 110 engage the supporting side tracks of the retractable truck bed cover assembly 100.

The retractable truck bed cover described herein can be securely locked in place covering the entire truck bed or rolled up in a housing as described in applicants' patent cited above.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A retractable truck bed cover configured for use with a truck bed of a vehicle, the retractable truck bed cover comprising:
    a pair of guide rails configured to secure to side walls of the truck bed of the vehicle;
    a plurality of slats configured to extend between and be positioned at least partially within the pair of guide rails; and
    a plurality of flexible joiner members, each of the plurality of flexible joiner members configured to connect adjacent ones of the plurality of slats, each of the plurality of flexible joiner members comprising a length and a cross-section extending along the length, the cross-section comprising a first connector section, a second connector section, and a hinge section positioned between and connecting the first and second connector sections, the hinge section comprising a first surface and a second surface opposite the first surface, and a notch positioned along the second surface, wherein the first surface is planar and wherein the notch extends from the second surface to an interior portion of the hinge section between the first and second surfaces, the notch defining a narrowing portion of the hinge section;
    wherein the plurality of slats comprises at least a first slat and a second slat, each of the first and second slats comprising a length and a cross-section extending along the length, the cross-section comprising:
        a slat surface having a leading edge and a trailing edge opposite the leading edge;
        a first receptor channel extending downwardly from the slat surface and positioned proximate the leading edge, the first receptor channel comprising a first side, a second side opposite the first side, and an opening on the first side, the first side being closer to the leading edge than the second side; and
        a second receptor channel extending downwardly from the slat surface and positioned proximate the trailing edge, the second receptor channel comprising a first side, a second side opposite the first side, and an opening on the second side, the second side being closer to the trailing edge than the first side, wherein the first side of the second receptor channel faces toward the second side of the first receptor channel;
    wherein, when the first and second slats are connected to one another by one of the flexible joiner members:
        the first connector section is positioned within the second receptor channel of the first slat and the second connector section is positioned within the first receptor channel of the second slat; and
        a first portion of the hinge section extends through the opening on the second side of the second receptor channel of the first slat and a second portion of the hinge section extends through the opening on the first side of the first receptor channel of the second slat; and
    wherein, when the first and second slats are in a flat position, the second receptor channel of the first slat is spaced from the first receptor channel of the second slat by a gap, wherein the gap and the narrowing portion of the hinge section allow the first and second slats to move between the flat position and an angled position.

2. The retractable truck bed cover of claim 1, wherein the first receptor channel extends downwardly from the slat surface to an end portion of the first receptor channel and the second receptor channel extends downwardly from the slat surface to an end portion of the second receptor channel, the opening on the first side of the first receptor channel positioned closer to the slat surface than to the end portion of the first receptor channel and the opening on the second side of the second receptor channel positioned closer to the slat surface than to the end portion of the second receptor channel.

3. The retractable truck bed cover of claim 1, wherein the length of each of the plurality of flexible joiner members extends along the length of the plurality of slats and between the pair of guide rails.

4. The retractable truck bed cover of claim 1, wherein, when the first and second slats are connected to one another by one of the flexible joiner members and the first and second slats are in the flat position, the hinged section is positioned below the slat surface.

5. The retractable truck bed cover of claim 1, wherein the notch is spaced from the first connector section by a first distance and spaced from the second connector section by a second distance, wherein the first and second distances are the same.

6. The retractable truck bed cover of claim 1, wherein the first and second receptor channels are configured to inhibit the first and second connector sections from exiting the first and second receptor channels along a direction non-parallel with respect to the length of the first and second slats.

7. The retractable truck bed cover of claim 1, wherein, when the first and second slats are in the flat position, the second side of the first receptor channel is parallel to the first side of the second receptor channel.

8. A retractable truck bed cover configured for use with a truck bed of a vehicle, the retractable truck bed cover comprising:
    a plurality of slats comprising at least a first slat and a second slat, each of the first and second slats comprising a length and a cross-section extending along the length, the cross-section comprising:
        a slat surface having a leading edge and a trailing edge opposite the leading edge;
        a first receptor channel extending downwardly from the slat surface and positioned proximate the leading edge, the first receptor channel comprising a first side, a second side opposite the first side, and an opening on the first side, the first side being closer to the leading edge than the second side; and
        a second receptor channel extending downwardly from the slat surface and positioned proximate the trailing edge, the second receptor channel comprising a first side, a second side opposite the first side, and an opening on the second side, the second side being closer to the trailing edge than the first side, wherein the first side of the second receptor channel faces toward the second side of the first receptor channel; and a plurality of flexible joiner members, each of the plurality of flexible joiner members configured to connect adjacent ones of the plurality of slats, each of the plurality of flexible joiner members comprising a length and a cross-section extending along the length, the cross-section comprising a first connector section, a second connector section, and a hinge section positioned between and connecting the first and second connector sections, the hinge section comprising a first surface and a second surface opposite the first surface, and a notch positioned along the second surface, wherein the first surface is planar and wherein the notch extends from the second surface to an interior portion of the hinge section between the first and second surfaces, the notch defining a narrowing portion of the hinge section;

wherein, when the first and second slats are connected to one another by one of the flexible joiner members:
the first connector section is positioned within the second receptor channel of the first slat and the second connector section is positioned within the first receptor channel of the second slat; and
a first portion of the hinge section extends through the opening on the second side of the second receptor channel of the first slat and a second portion of the hinge section extends through the opening on the first side of the first receptor channel of the second slat; and wherein, when the first and second slats are in a flat position, the second receptor channel of the first slat is spaced from the first receptor channel of the second slat by a gap, wherein the gap and the narrowing portion of the hinge section allow the first and second slats to move between the flat position and an angled position.

9. The retractable truck bed cover of claim 8, wherein the first receptor channel extends downwardly from the slat surface to an end portion of the first receptor channel and the second receptor channel extends downwardly from the slat surface to an end portion of the second receptor channel, the opening on the first side of the first receptor channel positioned closer to the slat surface than to the end portion of the first receptor channel and the opening on the second side of the second receptor channel positioned closer to the slat surface than to the end portion of the second receptor channel.

10. The retractable truck bed cover of claim 8, wherein the length of each of the plurality of flexible joiner members extends along the length of the plurality of slats.

11. The retractable truck bed cover of claim 8, wherein, when the first and second slats are connected to one another by one of the flexible joiner members and the first and second slats are in the flat position, the hinged section is positioned below the slat surface.

12. The retractable truck bed cover of claim 8, wherein the notch is spaced from the first connector section by a first distance and spaced from the second connector section by a second distance, wherein the first and second distances are the same.

13. The retractable truck bed cover of claim 8, wherein the first and second receptor channels are configured to inhibit the first and second connector sections from exiting the first and second receptor channels along a direction non-parallel with respect to the length of the first and second slats.

14. The retractable truck bed cover of claim 8, wherein, when the first and second slats are in the flat position, the second side of the first receptor channel is parallel to the first side of the second receptor channel.

15. A retractable truck bed cover configured for use with a truck bed of a vehicle, the retractable truck bed cover comprising:
a plurality of slats comprising at least a first slat and a second slat, each of the first and second slats comprising a length and a cross-section extending along the length, the cross-section comprising:
a slat surface having a leading edge and a trailing edge opposite the leading edge;
a first receptor channel extending downwardly from the slat surface and positioned proximate the leading edge, the first receptor channel comprising a first side, a second side opposite the first side, and an opening on the first side, the first side being closer to the leading edge than the second side; and
a second receptor channel extending downwardly from the slat surface and positioned proximate the trailing edge, the second receptor channel comprising a first side, a second side opposite the first side, and an opening on the second side, the second side being closer to the trailing edge than the first side, wherein the first side of the second receptor channel faces toward the second side of the first receptor channel; and
a plurality of flexible joiner members, each of the plurality of flexible joiner members configured to connect adjacent ones of the plurality of slats, each of the plurality of flexible joiner members comprising a length and a cross-section extending along the length, the cross-section comprising a first connector section, a second connector section, and a hinge section positioned between and connecting the first and second connector sections, the hinge section comprising a first surface and a second surface opposite the first surface, and a notch positioned along the second surface, wherein the first surface is planar and wherein the notch defines a narrowing portion of the hinge section;
wherein, when the first and second slats are connected to one another by one of the flexible joiner members and movable with respect to one another; and
wherein, when the first and second slats are in a flat position, the second receptor channel of the first slat is spaced from the first receptor channel of the second slat by a gap, wherein the gap and the narrowing portion of the hinge section allow the first and second slats to move between the flat position and an angled position.

16. The retractable truck bed cover of claim 15, wherein the first receptor channel extends downwardly from the slat surface to an end portion of the first receptor channel and the second receptor channel extends downwardly from the slat surface to an end portion of the second receptor channel, the opening on the first side of the first receptor channel positioned closer to the slat surface than to the end portion of the first receptor channel and the opening on the second side of the second receptor channel positioned closer to the slat surface than to the end portion of the second receptor channel.

17. The retractable truck bed cover of claim 15, wherein, when the first and second slats are connected to one another by one of the flexible joiner members and the first and second slats are in the flat position, the hinged section is positioned below the slat surface.

18. The retractable truck bed cover of claim 15, wherein the notch is spaced from the first connector section by a first distance and spaced from the second connector section by a second distance, wherein the first and second distances are the same.

19. The retractable truck bed cover of claim 15, wherein the first and second receptor channels are configured to inhibit the first and second connector sections from exiting the first and second receptor channels along a direction non-parallel with respect to the length of the first and second slats.

20. The retractable truck bed cover of claim 15, wherein, when the first and second slats are in the flat position, the second side of the first receptor channel is parallel to the first side of the second receptor channel.

\* \* \* \* \*